United States Patent
Dohrup et al.

(10) Patent No.: US 6,416,731 B1
(45) Date of Patent: Jul. 9, 2002

(54) PROCESS FOR CATALYTICAL STEAM REFORMING OF A HYDROCARBON FEEDSTOCK

(75) Inventors: Jesper Dohrup, Copenhagen; Claus J. H. Jacobsen, Jægerspris; Christian Olsen, Ballerup, all of (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/467,242

(22) Filed: Dec. 20, 1999

Related U.S. Application Data

(60) Provisional application No. 60/113,544, filed on Dec. 22, 1998.

(51) Int. Cl.[7] .................................................. C01B 3/26
(52) U.S. Cl. ........................ 423/653; 252/373; 502/524
(58) Field of Search ................................ 423/653, 654; 252/373; 502/327, 328, 349, 355, 303, 304, 305, 326, 524

(56) References Cited

U.S. PATENT DOCUMENTS

| | | | | |
|---|---|---|---|---|
| 3,436,358 A | | 4/1969 | Thygesen et al. ............ 252/466 |
| 3,786,137 A | * | 1/1974 | Thomas ....................... 423/600 |
| 3,926,583 A | * | 12/1975 | Rostrup-Nielsen ........... 48/214 |
| 4,542,112 A | | 9/1985 | Matsui et al. ................ 501/120 |
| 5,395,406 A | * | 3/1995 | Clavenna et al. ........... 48/198.7 |
| 5,595,719 A | * | 1/1997 | Ul-Haque et al. ......... 423/418.2 |
| 6,238,816 B1 | * | 5/2001 | Cable et al. .................. 429/17 |

FOREIGN PATENT DOCUMENTS

| | | | |
|---|---|---|---|
| EP | 0470626 A1 | 2/1992 | ............ B01J/23/82 |
| EP | 0640560 A1 | 3/1995 | ............ C01B/3/40 |
| JP | 54054982 A * | 5/1979 | ............ B01J/21/10 |
| JP | 56033036 A * | 4/1981 | ............ B01J/23/85 |
| RU | 2054963 | 2/1996 | ............ B01J/23/76 |

OTHER PUBLICATIONS

Jianguo Xu, et al., "Methane Steam Reforming, Methanation and Water–Gas Shift: I. Intrinisic Kinetics", *AIChE Journal*, vol. 35, No. 1, Jan. 1989; pp. 88–96.

* cited by examiner

*Primary Examiner*—Steven P. Griffin
*Assistant Examiner*—Maribel Medina Sanabria
(74) *Attorney, Agent, or Firm*—Dickstein Shapiro Morin & Oshinsky, LLP

(57) ABSTRACT

Process for catalytic steam reforming of a carbonaceous feedstock with improved resistance to sulphur poisoning and sintering characterized by contacting the feedstock with a nickel catalyst supported on magnesium aluminum spinel, $MgO \cdot xAl_2O_3$, wherein the spinel support has a specific surface area $A_{sp}[m^2/g]$ higher than $400 \cdot \exp(-T_c/400° \text{ C.})$ obtained by calcination at a temperature $T_c[° \text{C.}]$.

9 Claims, No Drawings

PROCESS FOR CATALYTICAL STEAM REFORMING OF A HYDROCARBON FEEDSTOCK

This application claims the benefit of the U.S. Provisional Application No. 60/113,544, filed Dec. 22, 1998.

BACKGROUND OF THE INVENTION

The present invention relates to steam reforming of hydrocarbons by contact with a supported nickel catalyst having improved activity and resistance to sulphur poisoning.

In particular, the invention is directed to an improved catalyst support material of high surface spinel, optionally promoted by Group III, IV or lanthanide metals. High surface spinel carrier materials provide a much improved sulphur resistance when employing hydrocarbon feedstock with high content of sulphur compounds due to a reduced degree of sulphur coverage on the carrier surface. Thereby, retaining sufficient catalytic activity with sulphur compounds containing feedstock.

The surface area of the carrier depends on the calcination temperature actually employed in the preparation of the carrier.

SUMMARY OF THE INVENTION

It has been found that spinel carrier material having a specific surface higher than or equal to a certain value after calcination at a predetermined calcination temperature posses the above advantageous properties.

Accordingly, the invention provides a process for catalytic steam reforming of a carbonaceous feedstock with improved resistance to sulphur poisoning and sintering characterised by contacting the feedstock with a nickel catalyst supported on magnesium aluminum spinel, $MgO \cdot xAl_2O_3$, with a specific surface area, $A_{sp}[m^2/g]$, higher than or expressed by the formula $A_{sp}=400 \cdot exp(-T_c/400° C.)$ obtained by calcination at a temperature $T_c[° C.]$ where $T_c \geq 400° C$.

As mentioned herein before, steam reforming activity of the spinel supported nickel catalyst is further improved when promoting the catalysts by inclusion of additional metals.

Preferred metals are Zr, Y, W, La, Ce or a mixture of lanthanides including La, Ce, Pr, Nd, Pm, Sm, Eu, Gd, Tb, Dy, Ho, Er, Tm, Yb, Lu, commercially available as lanthanide concentrate. The above metal promoters are preferably included in the catalyst in a total amount of 0.01% to 10% by weight, most preferred in an amount of 0.5% to 5% by weight. The nickel content in the catalyst will be between 10% and 60% by weight, preferably between 15% and 40% by weight.

When operating the inventive process in industrial scale, it may be sufficient to arrange the above catalyst as top layer in a catalyst bed of a conventional nickel steam reforming catalyst.

DETAILED DESCRIPTION OF THE PREFERRED EMBODIMENT

The above and further aspects and features of the invention will become more apparent from the following description illustrating by example specific embodiments of the invention.

EXAMPLE 1

Preparation of High Surface Area Spinel

Preferably, the first precipitation step is conducted under an atmosphere containing no water vapour to prevent hydrolysis of the aluminum alcoxide. In practise, the precipitation can be conducted under ambient conditions as long as excessive storage under these conditions is not required.

A solution was prepared by dissolution of 1 kg (4.05 mole) of aluminum tri-sec-butoxide, $Al(C_4H_9O)_3$, with stirring in a tank equipped with a condenser containing 20 kg of 1-propanol. Another solution containing 0.520 kg (2.02 mole) of magnesium nitrate hexahydrate, $Mg(NO_3)_2 \cdot 6H_2O$, dissolved in 1 kg of water and 10 kg of 1-propanol was rapidly added to the solution of $Al(C_4H_9O)_3$ with intense stirring and a white precipitate formed. After 30 min. the precipitate was isolated by filtration, washed with 10 kg water and dried at 110° C. Calcination at 550° C. for 4 hours yielded 0.275 kg of a pure $MgAl_2O_4$ spinel with a lattice constant of 8.076 Å, a crystal size of 41 Å and a surface area of 192 $m^2/g$.

Generally, this method can be applied using any aluminum alcoxide $Al(OR)_3$ precursor and any alcohol solvent (R=alkyl).

EXAMPLE 2

Preparation of High Surface Area Spinel

Preferably, the first precipitation step is conducted under an atmosphere containing no water vapour to prevent hydrolysis of the aluminum and magnesium alcoxide. In practise, the precipitation can be conducted under ambient conditions as long as excessive storage under these conditions is not required.

A solution was prepared by dissolution of 1 kg (6.18 mole) of aluminum triethoxide and 0.352 kg (3.08 mole) of magnesium ethoxide with stirring in a tank equipped with a condenser containing 30 kg of 99% ethanol. 1.5 kg of water was added to the solution with intense stirring and immediately a white precipitate formed. After 30 min. the white filtrate was collected by filtration. Upon calcination at 550° C. for 4 hours 0.423 kg of a pure $MgAl_2O_4$ spinel is obtained with a lattice constant of 8.081 Å, a crystal size of 45 Å and a surface area of 183 $m^2/g$.

Generally, this method can be applied using any alcoxides of magnesium and aluminum. The alcohol can be recovered from the aqueous filtrate by distillation—the details being dependent on the alcohol and alcoxides used.

EXAMPLE 3

Steam Reforming Activity

A series of nickel catalysts containing 10% to 60% by weight of nickel and containing varying contents of Zr, La, Ce, Y, or W (stabilizer), where prepared by sequential impregnations of a shaped high surface area magnesium aluminum spinel carrier by methods known in the art with nickel nitrate and ziconyl nitrate, $ZrO(NO_3)_2$, zirconium carbonate, $Zr(CO_3)_2$, basic zirconium carbonate, $Zr(CO_3)_x(OH)_{4-2x}$, X<2, lanthanum nitrate, $La(NO_3)_3$, cerium nitrate, $Ce(NO_3)_3$, yttrium nitrate, $Y(NO_3)_3$, or ammonium decatungstate, $(NH_4)_6H_2W_{12}O_{40}$. Before the impregnation with the stabilizer, the nickel nitrate was decomposed. After drying the tablets were loaded in a reactor and activated during heating to a temperature between 500° C. and 850° C. in a hydrogenflow containing 1% steam at atmospheric pressure.

The steam reforming activity was determined under the following conditions:

| Catalyst sieve fraction, | mm | 0.3–0.5 |
|---|---|---|
| Catalyst amount, | g | 0.025 |
| Temperature, | °C. | 400–750 |
| Feed gas composition, | Nl/h | |
| $NH_4$ | | 4.0 |
| $H_2O$ | | 16.0 |
| $H_2$ | | 1.6 |

The activities obtained at 500° C. are shown in Table 1.

Steam reforming activity of stabilized and unstabilized catalysts, here shown with 25% by weight nickel, relative to low surface area spinel (less than 25 $m^2/g$) supported nickel catalyst, R67GR obtained from Haldor Topsøe A/S, Nymøllevej 55, DK-2800 Lyngby, Denmark, at 500° C.

TABLE 1

| Catalyst | Stabilizer content (weight %) | Relative Activity |
|---|---|---|
| R67GR | 0 | 100 |
| Catalyst 1 | 0 | 142 |
| Catalyst 2 | 1.7% La | 149 |
| Catalyst 3 | 1.6% Y | 162 |
| Catalyst 4 | 0.95% Zr | 156 |
| Catalyst 5 | 4.4% w | 87 |
| Catalyst 6 | 3.1% Ce | 151 |

It is apparent from Table 1 that stabilizers Zr, L, Ce, Y have only minor influence on the steam reforming activity compared to the pure nickel catalyst. W stabilizer decreases the steam reforming activity.

EXAMPLE 4

Sulphur Poisoning Capacity

A series of nickel catalysts containing 10% to 60% by weight of nickel and containing varying contents of Zr, La, Ce, Y, or W (stabilizer) where prepared by sequential impregnations of a shaped high surface area magnesium aluminum spinel carrier by methods known in the art with nickel nitrate and zirconyl nitrate, $ZrO(NO_3)_2$, zirconium carbonate, $Zr(CO_3)_2$, basic zirconium carbonate, $Zr(CO_3)x(OH)_{4-2x}$, x<2, lanthanum nitrate, $La(NO_3)_3$, cerium nitrate, $Ce(NO_3)_3$, yttrium nitrate, $Y(NO_3)_3$, or ammonium decatungstate, $(NH_4)_6H_2W_{12}O_{40}$. Before the impregnation with the stabilizer, the nickel nitrate was decomposed. After drying the tablets were loaded in a reactor and activated during heating to a temperature between 500° C. and 850° C. in a hydrogenflow containing 1% steam at atmospheric pressure.

The capacity against sulphur poisoning was determined under conditions described by I. Alstrup et al. in Applied Catalysis, 1 (1981) 303–314 with dihydrogen sulphide content in the hydrogen flow between 10 ppm and 12 ppm. The sulphur poisoning capacities obtained at 550° C. are shown in Table 2.

Capacity against sulphur poisoning of stabilized and unstabilized catalysts, here shown with 25% by weight nickel, relative to low surface area spinel (less than 25 $m^2/g$) supported nickel catalyst, R67GR obtained from Haldor Topsøe A/S, Denmark, at 500° C.

TABLE 2

| Catalyst | Stabilizer content (weight %) | Capacity against sulphur poisoning |
|---|---|---|
| R67GR | 0 | 100 |
| Catalyst 1 | 0 | 231 |
| Catalyst 2 | 1.7% La | 239 |
| Catalyst 3 | 1.6% Y | 254 |
| Catalyst 4 | 0.95% Zr | 231 |
| Catalyst 5 | 4.4% W | 219 |
| Catalyst 6 | 3.1% Ce | 296 |

It is apparent from Table 2 that catalyst based on high surface area spinel have increased capacity against sulphur poisoning compared to conventional spinel based catalyst, and only minor influence of the stabilizer on the capacity against sulphur poisoning.

EXAMPLE 5

Sintering Stability

A series of nickel catalysts containing 10% to 60% by weight of nickel and containing varying contents of Zr, La, Ce, Y, or W (stabilizer) where prepared by sequential impregnations of a shaped high surface area magnesium aluminum spinel carrier by methods known in the art with nickel nitrate and zirconyl nitrate, $ZrO(NO_3)_2$, zirconium carbonate, $Zr(CO_3)_2$, basic zirconium carbonate, $Zr(CO_3)x(OH)_{4-2x}$, x<2, lanthanum nitrate, $La(NO_3)_3$, cerium nitrate, $Ce(NO_3)_3$, yttrium nitrate, $Y(NO_3)_3$, or ammonium decatungstate, $(NH_4)_6H_2W_{12}O_{40}$. Before the impregnation with the stabilizer, the nickel nitrate was decomposed. After drying the tablets were loaded in a reactor and activated during heating to a temperature between 500° C. and 850° C. in a hydrogenflow containing 1% steam at atmospheric pressure.

The sintering stability was determined by exposing the catalysts to a steam/hydrogen atmosphere at 30 bar, 500° C. and a steam to hydrogen ratio of 10 to 1 on a molar basis for more than 500 hours, and, subsequently, analyse the catalysts for steam reforming activity and capacity against sulphur poisoning as described in Examples 3 and 4, respectively.

The steam reforming activities and capacities against sulphur poisoning obtained after sintering are shown in Table 3.

Steam reforming activity and capacity against sulphur poisoning after sintering of stabilized and unstabilized catalysts are shown tested at 500° C. with 25% by weight nickel, compared with a low surface area spinel (less than 25 $m^2/g$) supported nickel catalyst, R67GR obtained from Haldor Topsøe A/S, Denmark, at 500° C.

TABLE 3

| Catalyst | Stabilizer content (weight %) | Relative activity | Capacity against sulphur poisoning |
|---|---|---|---|
| R67GR | 0 | 100 | 100 |
| Catalyst 1 | 0 | 100 | 192 |
| Catalyst 2 | 1.7% La | 132 | 242 |
| Catalyst 3 | 1.6% Y | 129 | 242 |
| Catalyst 4 | 0.95% Zr | 121 | 217 |

TABLE 3-continued

| Catalyst | Stabilizer content (weight %) | Relative activity | Capacity against sulphur poisoning |
|---|---|---|---|
| Catalyst 5 | 4.4% W | 79 | 258 |
| Catalyst 6 | 3.1% Ce | 139 | |

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. Process for catalytic steam reforming of a carbonaceous sulphur-containing feedstock with improved resistance to sulphur poisoning and sintering, the process comprising the steps of:
    contacting the carbonaceous sulphur-containing feedstock with a nickel catalyst supported on crystalline magnesium aluminium spinel, and
    producing a hydrogen- and/or carbon monoxide-rich gas, wherein the spinel has a specific surface area $A_{sp}(m^2/g)$ higher than $400 \cdot \exp(-T_c/400° C.)$ obtained by calcination of the magnesium aluminum spinel at a temperature $T_c(° C.)$.

2. The process of claim 1, wherein the spinel has a molar ratio of magnesium to aluminum between 1.5 and 3.0.

3. The process of claim 1, wherein the catalyst further contains at least one of the metals Zr, Y, W, La, Ce or lanthanide raw concentrate in a total amount of 0.01% to 10% by weight.

4. The process of claim 3, wherein the amount of the elements Zr, Y, W, La, Ce or lanthanide raw concentrate is between 0.5% and 5% by weight.

5. The process of claim 1, wherein the amount of nickel is between 10% and 60% by weight.

6. The process of claim 1, wherein the amount of nickel is between 15% and 40% by weight.

7. The process of claim 1, wherein the magnesium aluminum spinel supported nickel catalyst is arranged as a top layer in a fixed bed of a conventional nickel steam reforming catalyst.

8. The process of claim 7, wherein the top layer constitutes between 5% and 50% of the total catalyst bed.

9. The process according to any of the preceding claims 1–8, wherein the calcination temperature is higher than 400° C.

* * * * *